United States Patent [19]

Brennan

[11] Patent Number: 4,870,270
[45] Date of Patent: Sep. 26, 1989

[54] FIBER OPTIC SPEED SENSING FOR A ROTATING SHAFT

[75] Inventor: Brian W. Brennan, Norwich, N.Y.

[73] Assignee: Simmonds Precision Products, Inc., Wilmington, Del.

[21] Appl. No.: 160,738

[22] Filed: Feb. 26, 1988

[51] Int. Cl.[4] .............................................. G01D 5/34
[52] U.S. Cl. .............................. 250/227; 250/231 SE; 324/175
[58] Field of Search ............. 250/227, 231 SE, 231 R; 324/175

[56] References Cited

U.S. PATENT DOCUMENTS

| | | | |
|---|---|---|---|
| 4,278,881 | 7/1981 | Mann | 250/227 |
| 4,471,816 | 9/1984 | Wada | 250/227 |
| 4,524,054 | 7/1985 | White | 250/227 |
| 4,580,130 | 4/1986 | Tokunaga et al. | 324/175 |
| 4,638,155 | 1/1987 | Dorr | 250/231 SE |
| 4,639,595 | 1/1987 | Okita et al. | 250/227 |
| 4,746,791 | 5/1988 | Forkel | 250/231 SE |

Primary Examiner—David C. Nelms
Assistant Examiner—Stephone B. Allen
Attorney, Agent, or Firm—Dale R. Lovercheck

[57] ABSTRACT

A method and apparatus for monitoring the rate of rotation of a turbine engine shaft during the operation of the engine. A chopper extends radially from the shaft. Infrared radiation is passed through an input optical fiber having a beveled end positioned adjacent to the chopper which chops the infrared radiation. The chopped infrared radiation passes into a beveled end of an output optical fiber which is positioned adjacent to the chopper. The rate of rotation of the shaft is detected by monitoring the chopped infrared radiation from the output optical fiber. Carbonaceous coatings are formed on the beveled ends of the optical fibers by deposition of oil and combustion products thereon. While these coatings are opaque to visible light, they are transparent to the infrared radiation used in accordance with the invention.

25 Claims, 3 Drawing Sheets

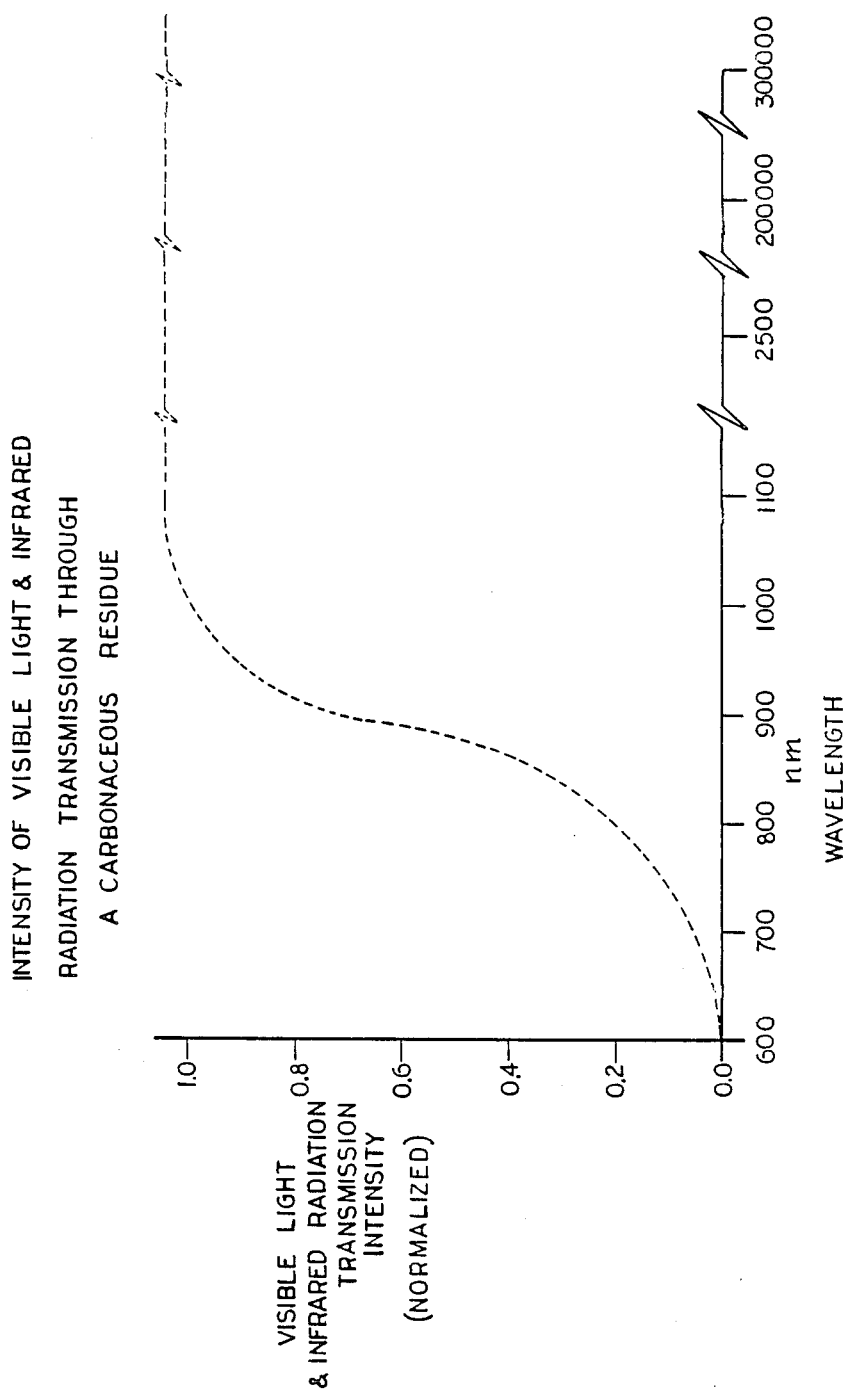

FIBER OPTIC SPEED SENSING FOR A ROTATING SHAFT

The invention relates to rotational speed sensing for turbine engine. In particular, infrared radiation is passed through optical fibers each having a beveled end position adjacent to a turbine engine drive shaft to monitor the rotational speed thereof. Infrared radiation is continuously transmitted through an input optical fiber to a beveled end located adjacent to a chopper. The chopper is mounted on the compressor drive shaft of the turbine engine. The chopped infrared radiation passes into the beveled end of an output fiber which is connected to a monitoring system. During turbine engine operation, the beveled ends of the optical fibers and the chopper are exposed to oil, combustion gases and particles which form a coating thereon. Turbine engine usually operate at temperatures above about 300° F. The accuracy of the monitoring of rotational speed is not significantly diminished by the carbonaceous coating which forms on the ends of the optical fibers. This coating is opaque to visible light but transparent to infrared radiation. The prior art does not show a fiber optic rotational speed sensor for use in the presence of coatings of oil, combustion gases and particles.

It is an object of the invention to provide a method and a system for monitoring the rotational speed of a rotating shaft at temperature above 300° F.

It is an object of the invention to provide a method and a system to automatically shut off the fuel supply to a turbine engine upon detection of drive shaft rotational speeds which indicate that the shaft has broken or fractured.

It is an object of the invention to provide a method and system of turbine engine drive shaft rotational speed monitoring at temperatures above 500° F. using infrared radiation quided by optical fibers.

Takahashi, et al., in U.S. Pat. No. 4,637,264, disclose an optical torque detector which uses a pair of rotary plates, each having a radial optical grid. Charges in torque are detected from shifting of the Moire fringe pattern between radially inner and outer sections of the optical grids. Swiden, et al., in U.S. Pat. No. 3,886,354, disclose a device for optically scanning of the speed of a rotating device such as a vehicle wheel. Circumferentially alternating opaque and transparent areas of a rotating disc block and transmit a light beam. Bertollini, in U.S. Pat. No. 4,624,570, discloses a fiber optic displacement sensor having input and output optical fibers each with a 45° end surface positioned in a liquid adjacent to an object from which light from the input fiber is reflected to the output fiber. Uchida, in U.S. Pat. No. 4,704,523, discloses an optical rotary encoder device having a rotating plate with a plurality of light transmission and light shielding areas.

BRIEF DESCRIPTION OF THE INVENTION

A method and apparatus for monitoring the rate of rotation of a drive shaft during the operation of a turbine engine. A chopper extends radially from the shaft. Infrared radiation is passed through an input optical fiber having a beveled end positioned adjacent to the chopper which chops the infrared radiation. The chopped infrared radiation passes into a beveled end of an output optical fiber which is positioned adjacent to the chopper. The rate of rotation of the shaft is detected by monitoring the chopped infrared radiation from the output optical fiber. Carbonaceous coatings are formed on the beveled ends of the optical fibers by deposition of oil and combustion products thereon. While these coatings are opaque to visible light, they are transparent to the infrared radiation. The coatings do not significantly reduce the intensity of infrared radiation passing through the beveled ends of the optical fibers.

BRIEF DESCRIPTION OF THE DRAWINGS

FIG. 3 shows a curve for intensity of visible light and infrared radiation transmission through a film of carbonaceous residue at wavelengths from 600 nm (visible) to 300,000 nm (infrared).

BEST MODE OF CARRYING OUT THE INVENTION

Figure 1:
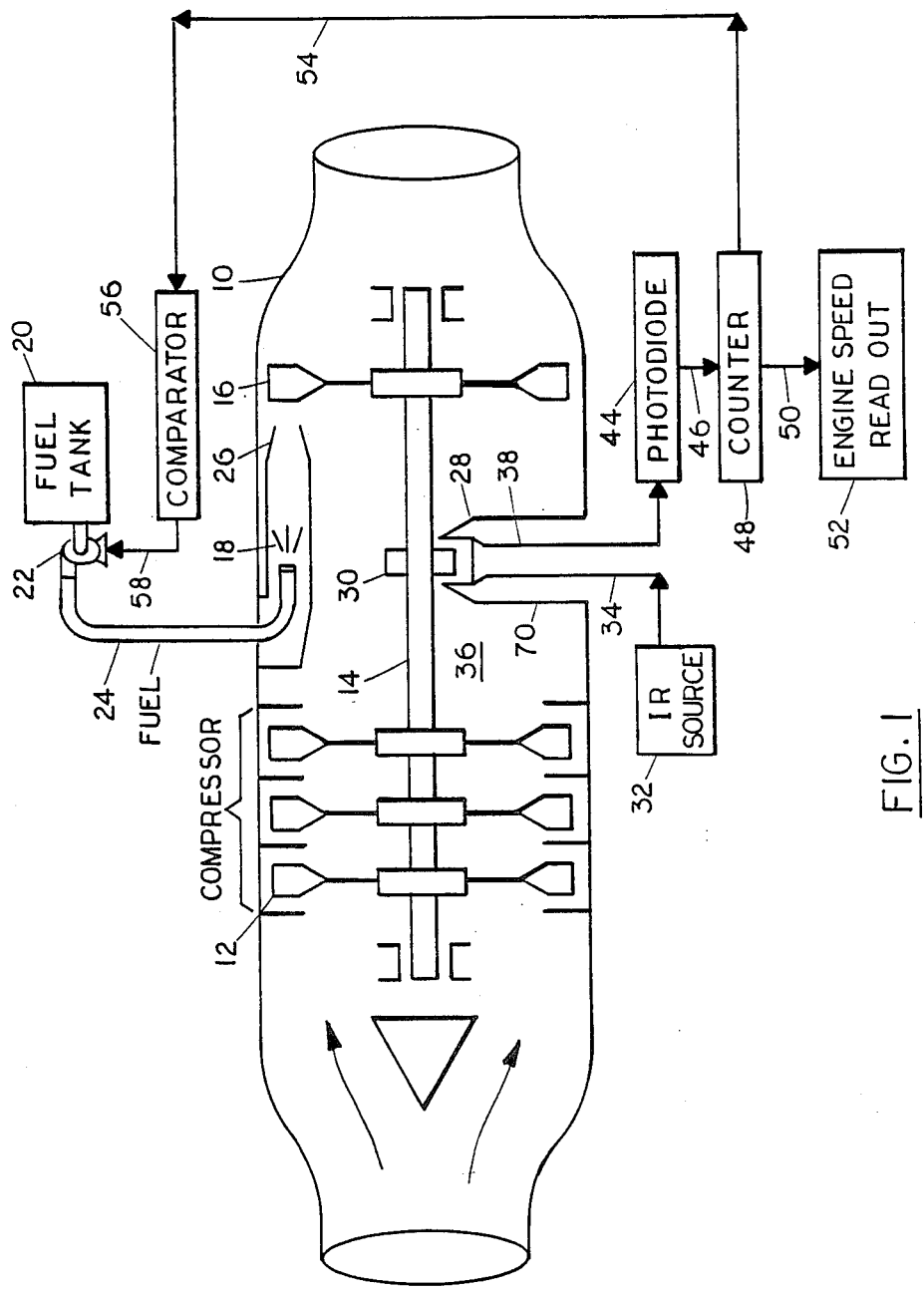
FIG. 1 is a schematic representation of a fiber optic speed sensor system in accordance with the invention.

A preferred embodiment of the invention will be described with reference to FIGS. 1–3. With more particular reference to FIG. 1, a rotational speed monitoring turbine engine 10 is shown which includes compressor blades 12 mounted on shaft 14. Turbine blades 16 are mounted on shaft 14. Fuel 18 is pumped from fuel tank 20 by pump 22 through fuel line 24 into combustion chamber 26, where it is burned with compressed air. The combustion products of the fuel are exhausted across turbine blades 16 which turn shaft 14 and compressor blades 12 which are mounted on shaft 14.

Air is compressed by compressor blades 12 before being conveyed into combustion chamber 26. The speed sensor 28 monitors the rate of rotation of the shaft 14. Teeth 30 chop a continuous beam of infrared radiation which is emitted from infrared radiation emitting diode 32 and conveyed through input optical fiber 34. The end of optical fiber 34 adjacent to chopper teeth 30 is beveled to about a 45° angle to the central axis of fiber 34 to reflect radiation across the shaft 14. FIG. 2 shows an enlarged view of the teeth 30 on the shaft 14 adjacent to optical fibers 34 and 38. The teeth 30 act as a chopper as they interrupt the infrared radiation being reflected from 45° beveled end face 40 of input optical fiber 34 to end face 42 of output optical fiber 38, which is beveled at a 45° angle to the central axis of fiber 38. The use of the 45° beveled ends on the optical fibers allows the use of the fibers in a narrow space, and reduces the space required for rotational speed monitoring. The plane of end face 42 and the plane of end face 40 intersect at about a 90° angle. The fibers 34 and 38 are supported by jig 72 within metal tube 70.

A flat face 40' adjacent to 45° beveled end face 40 of the input optical fiber allows the infrared radiation to pass to flat face 42' of the output optical fiber without substantial divergence thereof. Thus, the collimation of the infrared radiation is maintained by the flat faces 40' and 42'. Since the optical fibers have cylindrical walls the radiation would be focused in the flat faces 40' and 42' were no provided. Such focusing of the radiation would make construction of an embodiment of the invention substantially less practical, as the output fiber would need to be placed near the focal plane of the radiation.

In the preferred embodiment of the invention, the infrared radiation passes through the input optical fiber 34 to the face 40 beveled at an angle of 45° to the central axis of the fiber 34. From the face 40, reflected infrared radiation passes across the fiber 34 and through flat face 40'. The planes of flat faces 40' and 42' are substantially parallel and intersect at an angle of about 90° by the infrared radiation reflected from face 40. After passing through flat face 42', the infrared radiation is reflected from beveled face 42 into the output optical fiber 38.

The chopper teeth 30 are positioned equidistant from the rotational axis of the shaft 14. Each of the teeth 30 is equal in length, and equidistance from each of the adjacent teeth. The infrared radiation chopped by the teeth 30 passes through the turbine atmosphere 36 into the output fiber 38. The chopped infrared radiation is not significantly obstructed by the carbonaceous coating or film of oil and combustion products from the turbine atmosphere on the beveled ends 40 and 42 of the optical fibers. The opacity of the carbonaceous coating to visible light renders the use thereof substantially inoperative or impractical in the system of the invention. The chopped infrared light from optical fiber 38 is converted to electrical current by photodiode 44 which is connected by electrical conductor 46 to counter 48. Counter 48 is connected by electrical conductor 50 to engine speed display 52.

The operator may visually observe the rotational speed of the shift 14 by viewing the display 52. The operator may regulate the volumetric flow rate of fuel to the combustion chamber 26 to vary the speed of the drive shaft 14. Counter 48 is connected by electrical conductor 54 to comparator 56, which compares the rotational speed of the shaft 14 to a preset rotational speed limit. The limit may be set based on experience that the shaft 14 has broken if its speed reaches or exceeds the preset limit. When the rotational speed of the drive shaft reaches the preset limit, the comparator 56 conveys a signal through electrical conductor 58 to open the switch of pump 22 which shuts it off stopping the flow of fuel in fuel in line 24. This prevents further damage to the engine, for example, from the blade 16 being broken at rotational speeds far in excess of those of normal operation and design limitations.

Figure 2:
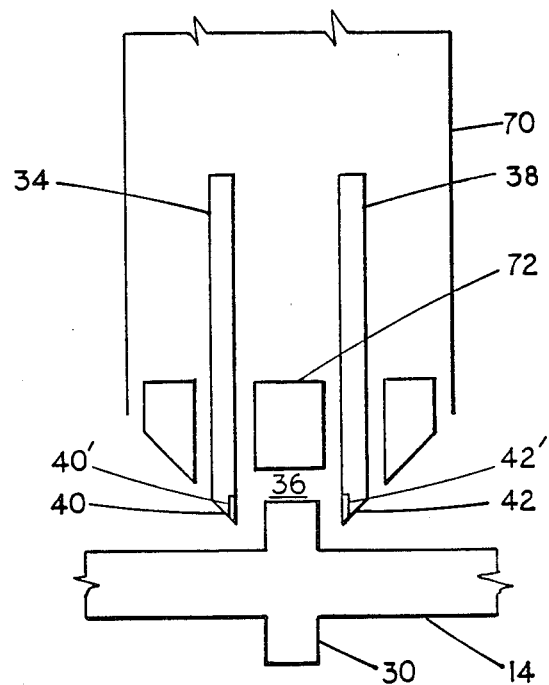
FIG. 2 is a schematic representation of the beveled ends of the optical fibers supported adjacent to a chopper in accordance with the invention.

With more particular reference to FIG. 2, the input fiber 34 and output fiber 38 are shown supported within metal tube 70 by jig 72 which is a block which is preferably made of metal such as aluminum with passages through which the fibers extend, and a slot machined to accommodate the teeth 30. After the fibers are glued into the passages, the protruding fiber ends are ground and polished to be coplanar with the lower surface of the jig 72 which is at a 45 degree angle to central axes of the optical fibers.

An infrared radiation (IR) source 32 provides infrared radiation. For example a 940 nanometer infrared radiation emitting diode may be used to inject infrared radiation into the radiation source end of the input fiber 34, through which it travels to the 45 degree polished face at which it is directed to the side of the fiber and into the turbine atmosphere 36. As the teeth 30 move past the beveled ends of the fibers, the spaces there between allow transmission of the infrared radiation to the beveled end of the output fiber. The presence of oil and products of combustion on the beveled ends 40 and 42 of the fibers 34 and 38 do not substantially interfere with infrared radiation transmission. The temperature at the beveled ends 40 and 42 may be greater than 300° F. during operation of the turbine 30 engine. At such temperatures the oil and products of combustion on the beveled ends 40 and 42 forms a carbonaceous film which is opaque to visible light.

A micron (or micrometer) is equal to one millionth $(10^{-6})$ meter. A nanometer (nm) is one billionth $(10^{-9})$ meter and is equal to one millimicron. The infrared radiation range of wavelengths of the electromagnetic spectrum extends from 0.78 micron (780° nm) to approximately 300 microns (300,000 nm). This range includes wavelengths which are longer than visible light and shorter than microwave radiation. Preferably, the infrared radiation used in accordance with the method of the invention of monitoring the rotational speed of a drive shaft of a turbine engine consists substantially of one or more wavelengths greater than 780 nm and less than 300,000 nm. More preferably, the infrared radiation used in the method of the invention consists substantially of one or more wavelengths greater than 850 nm and less than 200,000 nm. Most preferably, the infrared radiation used in accordance with the method of the invention substantially consists of one or more wavelengths greater than about 780 nm and less than about 2500 nm. In this most preferred range, wavelengths above 900 nm are preferred and wavelengths above 1100 nm are most preferred.

FIG. 3 shows a curve for the intensity of visible light and infrared radiation transmitted through a film as a function of wavelength. This film is a carbonaceous residue baked onto a glass plate. The intentsity of light and infrared radiation transmitted through the film of baked carbonaceous residue is shown to increase from wavelengths from visible light (600 nm) to short wavelength infrared radiation (1,100 nm). Infrared radiation having wavelengths from about 1100 nm to about 300,000 nm is substantially completely transmitted through the film. Very little, if any, visible light is transmitted through the film while infrared radiation is substantially unobstructed by the film.

For a given operating temperature, there is extreme background noise within a range of high intensity infrared radiation wavelengths around the peak in the black body radiation emitted from the engine 10. The monitoring wavelength emitted from the infrared radiation emitting diode 32 should not be within this range of high intensity wavelengths, because the monitoring wavelength would be dominated by the extreme background noise. For example, at an engine operating temperature of (572° F.) the peak in black body radiation occurs at about 5,000 nm. Thus, the use of an infrared radiation source which emits a wavelength in the range of within the range of from about 4900 nm to about 5100 nm would be noise dominated. While at sufficiently lower and higher engine operating temperatures, the use of a monitoring wavelength in the 4900 nm to 5100 nm range of wavelengths would not be dominated by interference from black body radiation.

The speed monitoring method and engine of the invention operate at all temperatures from start-up at ambient temperature (for example a 0° F.) to steady operation temperature of over 600° F. Preferably, the method and engine of the invention are operated at above 300° F. More preferably, the method and engine of the invention are operated at above 500° F.

Other features, advantages and specific embodiments of this invention will become readily apparent to those exercising ordinary skill in the art after reading the foregoing disclosures. In this regard, while specific embodiments of this invention have been described in considerable detail, variations and modifications of these embodiments can be effected without departing from the spirit and scope of the invention as disclosed and claimed.

What is claimed is:

1. A method of displaying the rate of rotation of a turbine engine drive shaft comprising:
   (a) providing a turbine engine, a source of monitoring infrared radiation, an input optical fiber, an output optical fiber, a chopper supported by a said turbine engine drive shaft, a detector, a counter and a display, said turbine engine comprising a chamber and a turbine engine drive shaft, said chopper being positioned within said chamber,
   said input optical fiber being positioned to receive infrared radiation from said source and having an end face positioned adjacent to said chopper,
   said output optical fiber being positioned to guide infrared radiation to said detector and having an end face positioned adjacent to said chopper on the opposite side of said chopper from said end face of said input fiber,
   said detector being connected to said counter,
   (b) operating said turbine engine whereby oil and combustion products are produced in said chamber, said oil and said products forming a coating on at least one said end face, said coating being substantially opaque to visible light,
   (c) continuously providing monitoring infrared radiation from said source through an input fiber, said chopper and said output fiber to said detector, said detector providing a detector signal to said counter, said counter providing a counter signal to said display, said counter signal being representative of the rate of rotation of said shaft,
   (d) displaying said counter signal on said display whereby the rate of rotation of the turbine engine drive shaft is displayed.

2. The method of claim 1 wherein each said beveled end face is beveled at a 45 degree angle to the central axis of the optical fiber.

3. The method of claim 1 wherein said chopper and said beveled ends of said optical fibers are supported within a turbine engine housing, the temperature within said housing being above 500° F., each said beveled end face being coated with a material which is opaque to visible light.

4. The method of claim 1 wherein said infrared radiation consists substantially of wavelengths greater than about 780 nm and less than about 2500 nm.

5. The method of claim 1 wherein said infrared radiation substantially consists of wavelengths between about 900 nm and about 1100 nm.

6. The method of claim 1 wherein said coating is formed on said end face of said input fiber.

7. The method of claim 1 wherein said coating is formed on said end face of said output fiber.

8. The method of claim 1 wherein at least one said end face is beveled.

9. The method of claim 1 wherein said end face of said input fiber and said end face of said output fiber are beveled.

10. The method of claim 1 further comprising comparing said rate of rotation of said shaft to a preset rate in a comparator.

11. The method of claim 1 wherein the said infrared radiation consists substantially of wavelengths greater than about 780 nm and less than about 300,000 nm.

12. The method of claim 1 wherein said chopper comprises a series of teeth positioned equidistant from the rotational axis of said shaft.

13. The method of claim 10 wherein said chopper is supported by a turbine engine drive shaft in a turbine engine, said engine being adapted to receive fuel from a fuel tank through fuel line having a fuel pump connected thereto, said fuel pump being connected to said comparator, and further comprising controlling said fuel pump in response to a signal from said comparator.

14. The method of claim 11 wherein the temperature of said beveled ends is at least 500° F. and the wavelength of said monitoring infrared radiation is substantially lower or higher than the peak wavelength of black body radiation emitted from said engine, whereby said black body radiation does not significantly interfere with said monitoring infrared radiation.

15. The method of claim 12 wherein each of said teeth is equal in length.

16. The method of claim 12 wherein each of said teeth is equidistant from each of the adjacent teeth.

17. A turbine engine, comprising:
   a turbine engine housing,
   an air compressor turbine,
   a fuel conduit,
   a combustion chamber,
   A compressor drive shaft,
   a drive turbine,
   a chopper,
   an infrared radiation source,
   an input optical fiber,
   an output optical fiber,
   an infrared radiation detector,
   said compressor drive shaft and said combustion chamber being positioned within said engine housing,
   said air compressor turbine being adapted to convey compressed air to said combustion chamber,
   said fuel conduit being adapted to convey fuel to said combustion chamber,
   said shaft supporting said drive turbine,
   said compressor turbine, and said chopper, said infrared radiation source being positioned adjacent to a first end of said input optical fiber,
   said chopper being positioned adjacent to a second end of said output optical fiber,
   said chopper being positioned adjacent to a first end of said output optical fiber,
   said infrared radiation detector being positioned adjacent to a second end of said output optical fiber.

18. The speed monitoring turbine engine of claim 17 further comprising a comparator and a fuel pump, said comparator being connected to said infrared radiation detector and to said fuel pump, said fuel pump being connected to said fuel conduit.

19. The speed monitoring turbine engine of claim 17 wherein said first end of said input optical fiber includes a face beveled at a 45° angle to the central axis of the input optical fiber.

20. The speed monitoring turbine engine of claim 18 wherein the temperature within said housing adjacent to said chopper is greater than 500° F.

21. The speed monitoring turbine engine of claim 18 wherein said second end of said input, optical fiber further comprises a carbonaceous film adjacent to said chopper, said carbonaceous film being opaque to visible light.

22. The speed monitoring turbine engine of claim 18 wherein said first end of said output optical fiber further comprises a film adjacent to said chopper, said film being opaque to visible light.

23. The speed monitoring turbine engine of claim 22 wherein said first end of said input optical fiber further comprises an input flat face adjacent to said 45° beveled face.

24. The speed monitoring turbine engine of claim 23 wherein said first end of said output optical fiber comprises an output flat face, the plane of said output flat face being substantially parallel to the plane of said input flat face.

25. The speed minotirong turbine engine of claim 24 wherein said first end of said output optical fiber includes a face beveled at a 45° angle to the central axis of said output optical fiber.

* * * * *

UNITED STATES PATENT AND TRADEMARK OFFICE
CERTIFICATE OF CORRECTION

PATENT NO. : 4,870,270
DATED : September 26, 1989
INVENTOR(S) : BRIAN W. BRENNAN It is certified that error appears in the above-identified patent and that said Letters Patent is hereby corrected as shown below:

Column 2, line 61

" no " should read -- not --

Column 3, line 4

" intersect " should read -- intersected --

Signed and Sealed this

Eighteenth Day of September, 1990

Attest:

HARRY F. MANBECK, JR.

Attesting Officer     Commissioner of Patents and Trademarks